United States Patent [19]

Chupka et al.

[11] 4,328,096
[45] May 4, 1982

[54] DUAL FLOW SCREENING APPARATUS

[75] Inventors: David E. Chupka; Peter Seifert, both of Middletown, Ohio

[73] Assignee: The Black Clawson Company, Middletown, Ohio

[21] Appl. No.: 261,357

[22] Filed: May 7, 1981

Related U.S. Application Data

[63] Continuation of Ser. No. 130,917, Mar. 17, 1980, abandoned.

[51] Int. Cl.³ .............................................. B07B 1/20
[52] U.S. Cl. .................................. 209/240; 209/273; 209/306; 210/415
[58] Field of Search .............. 209/273, 300, 306, 270, 209/240, 243, 254, 493, 488, 498; 210/415, 456; 137/261 A

[56] References Cited

U.S. PATENT DOCUMENTS

| 897,144 | 8/1908 | Priem | 209/273 |
|---|---|---|---|
| 1,004,453 | 9/1911 | Parker | 209/273 |
| 1,036,318 | 8/1912 | Parker | 209/273 |
| 1,172,239 | 2/1910 | Haug | 29/270 |
| 1,959,210 | 5/1934 | Knight | 209/273 |
| 2,056,310 | 10/1936 | Palmer | 209/273 |
| 2,855,099 | 10/1958 | DeKoning | 209/273 |
| 3,275,156 | 9/1966 | Valtanen | 209/273 X |
| 3,363,759 | 1/1968 | Clarke-Pounder | 210/415 |
| 3,373,875 | 3/1968 | Krikorian | 210/305 |
| 3,713,536 | 1/1973 | Hooper | 209/273 |

FOREIGN PATENT DOCUMENTS

| 315161 | 11/1915 | Fed. Rep. of Germany | 209/270 |
|---|---|---|---|
| 983441 | 2/1956 | Fed. Rep. of Germany | 298/300 |
| 852994 | 3/1958 | United Kingdom . | |
| 1070451 | 2/1965 | United Kingdom . | |

Primary Examiner—Robert Halper
Attorney, Agent, or Firm—Biebel, French & Nauman

[57] ABSTRACT

A pressurized screening device has an inlet arrangement by which a feed slurry is directed to a central portion of a screening chamber, a plurality of chevron-shaped rotor foils are mounted for rotation near the inner surface of a cylindrical screenplate to split the flow of the feed slurry into separate flow portions directed toward opposite ends of the screening chamber, and separate reject chambers are provided adjacent its opposite ends of its screening chamber. The chevron-shaped foil structure enables the screening device to operate as if it were two smaller screening devices and to remove efficiently both light and heavy impurities from the feed stock.

10 Claims, 4 Drawing Figures

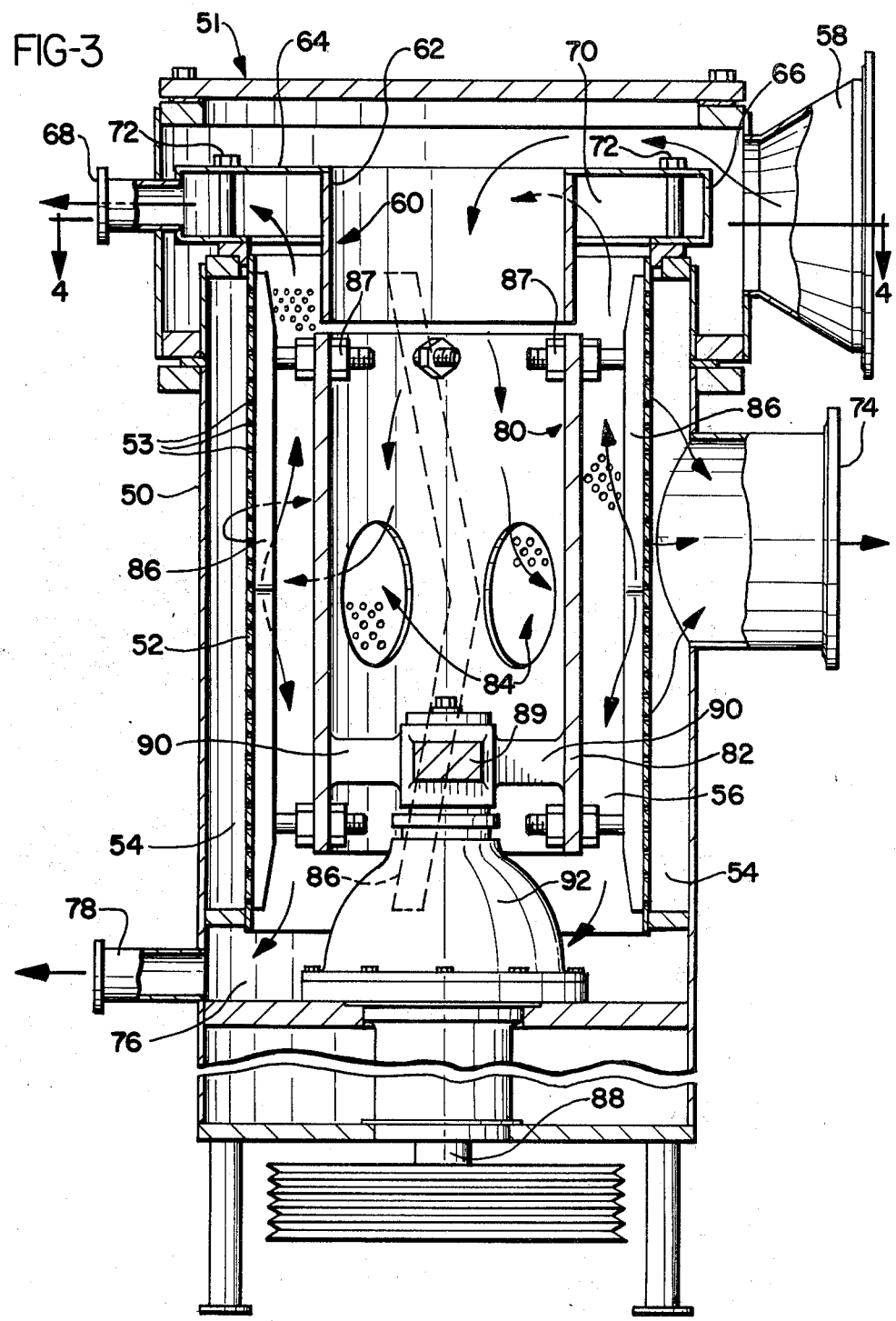

DUAL FLOW SCREENING APPARATUS

This is a continuation of application Ser. No. 130,917 filed Mar. 17, 1980 now abandoned.

BACKGROUND OF THE INVENTION

This invention relates to screening of slurries to remove objectionable impurities, and more particularly to pressurized pulp screens for removing debris from pulp slurries and paper making stock.

The production of paper making fibers by any known pulping method is incomplete in that certain portions of the wood are not broken down into individual fibers. Such wood portions, which include debris such as shives, bark, slivers, and chop, as well as foreign particles such as sand, grit, and pieces of metal and plastic, must be separated from the paper making fibers before the manufacture of paper can begin. Presently, paper making stocks made from secondary fibers (waste paper stocks) contain much greater amounts of foamed and other light weight plastic particles having specific gravities less than water than have been present in the past.

Removal of these objectionable particles has heretofore been accomplished both by centrifugal cleaning to separate high specific gravity particles from good paper making fibers and by screening to separate large surface area particles from good paper making fibers. In recent years, pressurized screens have become the most common type of screening apparatus in use.

These screening devices generally have a pressurized housing with a cylindrical screen plate dividing the housing into an inner chamber and an outer annular chamber and includes a rotor in the proximity of the screenplate. The slurry to be screened is introduced into the inner chamber and has both a rotary and axial velocity imparted to it by the rotor. The cylindrical plate has slots or holes through which the desirable or accepts fibers pass while the undesirable or rejects particles are retained by the cylindrical screen plate. The accepts and rejects streams are then separately removed from the screening apparatus. Examples of such screening apparatus include Cannon et al. U.S. Pat. No. 2,975,899, and Martindale U.S. Pat. No. 2,835,173.

However, since pressurized screens first appeared commercially, considerable changes have taken place in the industry. The most important of these changes with respect to these screens have been increased capacity requirements and a change in the nature of objectionable particles to be removed. For example, while the early screening devices had cylindrical screenplates on the order of 36 inches in diameter and 12 to 24 inches in height, demands for increased capacity have resulted today in screenplates on the order of 60 inches in diameter and 48 inches in height. However, the relative capacity per unit area of screen surface of these larger screening devices has not been as great as that of the smaller screens.

This loss of capacity may be due, at least in part, to the thickening of the pulp as it moves along the longer screenplates utilized in present devices. This thickened pulp causes a decrease in the hydraulic capacity of a screening device. Moreover, by the time the pulp reaches the base of the screenplate, it may have been accelerated by the rotor mechanism to an extent that the relative velocity differential between the pulp and rotor blades is too small for efficient screening.

Additionally, the standard pressurized screening device in use today was designed with the idea that impurities would be removed through a rejects outlet located at the bottom of the device. Such a design is not efficient where, as with many paper machine furnishes today, considerable amounts of foamed and other lightweight plastic particles are present. Some particles tend to float upwardly when entering the screen housing and are difficult to remove from screening devices having only a single rejects outlet located at the base thereof.

Accordingly, the need exists in this art for a high capacity pressure screen which can efficiently and effectively achieve essentially complete separation of desirable fibers from both heavy and light objectionable particles in a pulp slurry.

SUMMARY OF THE INVENTION

The present invention meets that need by providing a pressurized screening device having means to direct the flow of a feed slurry to the central portion of a cylindrical screenplate and a plurality of chevron-shaped rotor foils mounted for rotation near the inner surface of the screenplate which act to split the flow of the feed slurry into separate portions directed toward the opposite ends of the screenplate. Two separate rejects collection chambers are provided near each end of the screenplate, respectively. Although the invention will be described as a vertically-oriented device, it will be appreciated by those skilled in the art that the device can be modified to function when rotated 90° on its side.

In operation, a feed slurry is directed to the interior of the apparatus and then to the central portion of the cylindrical screenplate. The slurry is rotated by a plurality of chevron-shaped foils mounted on a rotor mechanism near the inner surface of the screenplate. The chevron-shaped foils divide the slurry into an upward flow portion and a downward flow portion. Accepts from each portion pass through the screenplate, are collected in a common accepts chamber, and are removed from the apparatus through an accepts outlet. Reject fibers, as well as objectionable heavy and light particles, migrate toward the respective rejects collection chambers located near the top and at the base of the screenplate.

The chevron-shaped rotor foil structure enables the screening device to operate as if it were two smaller screening devices, each having a relatively short length to diameter ratio. The advantages of operating the upper and lower halves of the screenplate as if they were two separate, but smaller, screenplates include greater capacity per unit area of screen surface as well as better separation and removal of both light and heavy impurities.

The capacity of the apparatus of the present invention is greater because the pulp does not dewater as much as it would if it moved along the entire length of the screen. Directing the feed to the central portion of the screen and dividing it, by means of the rotation of the chevron-shaped rotor foils, into an upward flow portion and a downward flow portion, causes the path traversed by the pulp toward rejects collection chambers at each end of the device to be is relatively short.

Moreover, because of the increased capacity per unit area of screen of the present invention, a smaller diameter screenplate may be utilized to obtain the same capacity as larger diameter prior art devices. This enables the rotors and foils to be fabricated of thinner material and yet to possess the requisite strength and stiffness for operation. Thinner foils require less driving power to rotate the pulp slurry and result in an energy savings over prior art devices of the same overall capacity.

Accordingly, it is an object of the present invention to provide a pressurized screening device which efficiently and effectively removes undesirable fibers and objectionable heavy and light particles from desirable fibers in a pulp slurry. This and other objects and advantages of the invention will become apparent from the following description, the accompanying drawings, and the appended claims.

BRIEF DESCRIPTION OF THE DRAWINGS

FIG. 3 is a vertical section of another embodiment of the apparatus of the present invention with arrows indicating the direction of flow of a slurry through the apparatus.

DESCRIPTION OF THE PREFERRED EMBODIMENTS

Figure 1:
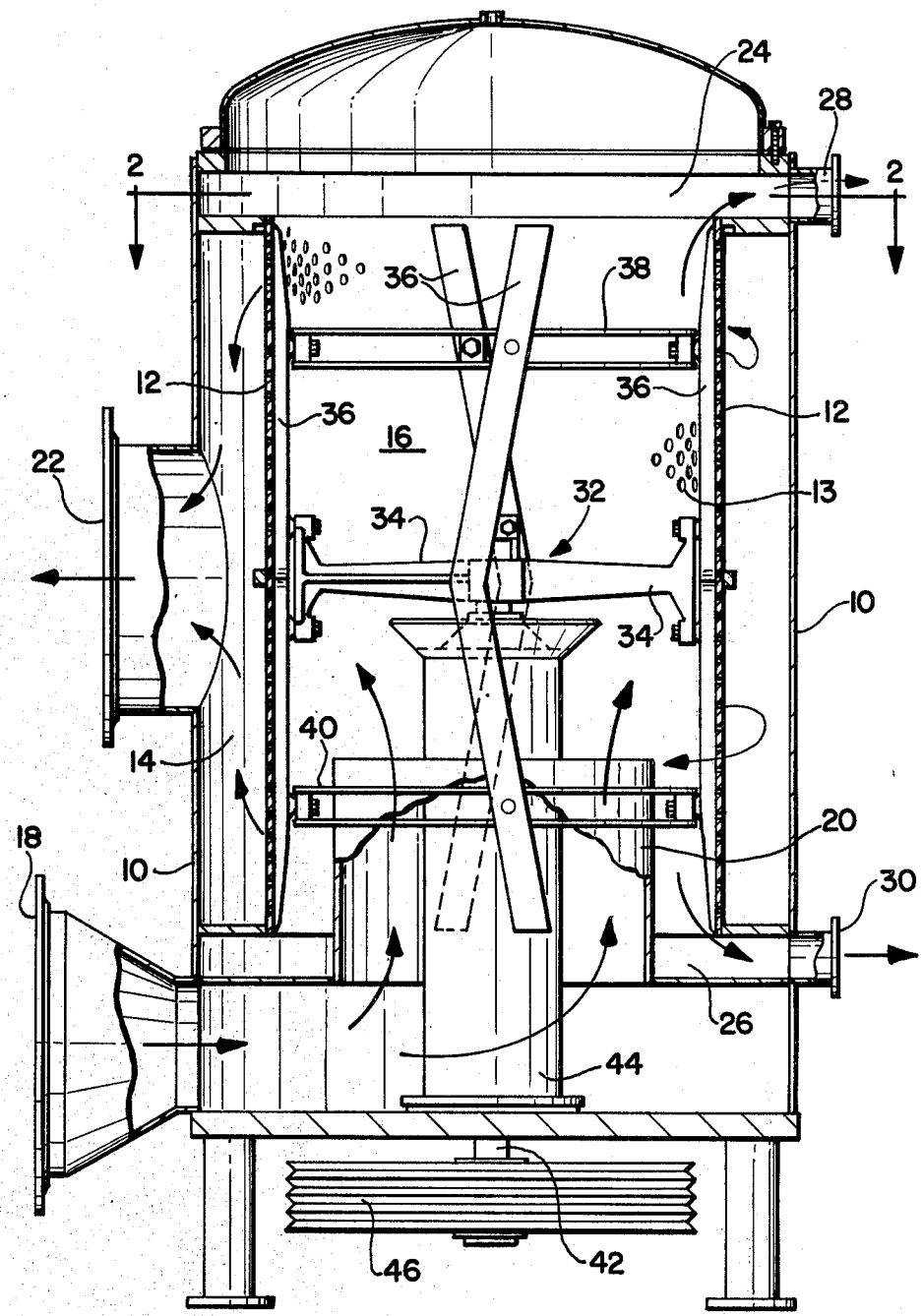
FIG. 1 is a vertical section of the apparatus of the present invention with arrows indicating the direction of flow of a slurry through the apparatus.
Figure 2:
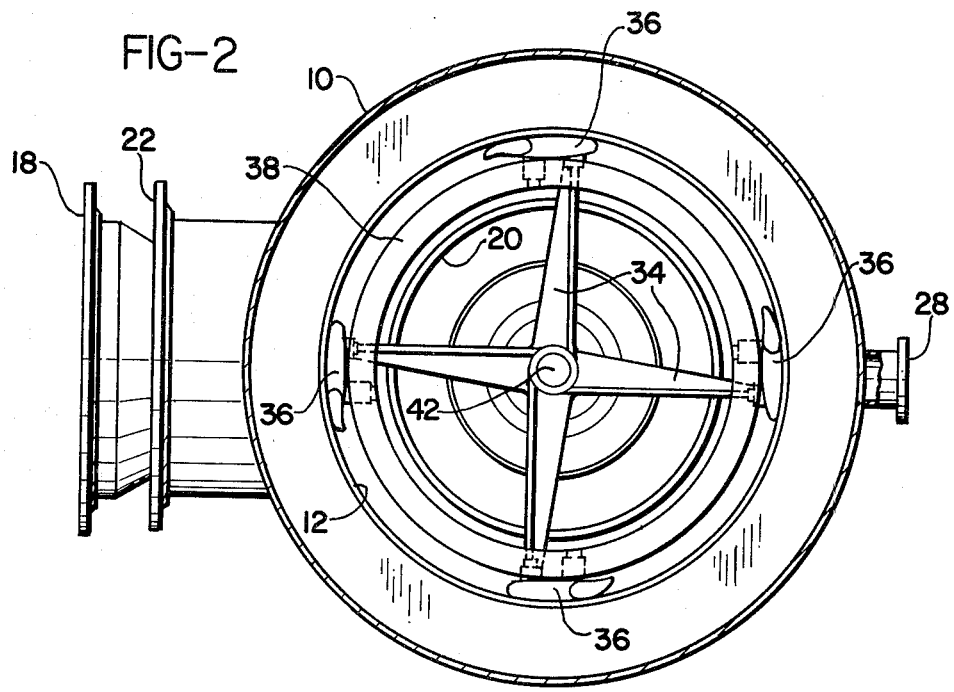
FIG. 2 is a cross-section taken along line 2—2 in FIG. 1.

As illustrated in FIGS. 1 and 2, a pressurized screening device in accordance with the present invention comprises a pressurized housing 10 having an elongated, cylindrical screenplate 12 with slots or holes 13 therein dividing the housing into an annular outer accepts chamber 14 and an inner screening chamber 16.

The slurry of pulp to be screened enters inlet 18 and passes through conduit 20 before being into screening chamber 16. The length and diameter of conduit 20 may be varied to control the point at which the slurry enters screening chamber 16. Preferably, conduit 20 is designed so that the slurry will flow upwardly into chamber 16 and begin to flow outwardly at about the midpoint along the length of screenplate 12.

An outlet 22 for accepted fiber is provided in fluid communication with accepts chamber 14. Large fibers and other impurities which do not pass through screenplate 12 are collected in rejects collection chambers 24 and 26 for removal from the apparatus through rejects outlets 28 and 30, respectively.

A rotating impeller 32 is located in chamber 16 with its vertical axis concentric with screenplate 12 and includes at least two radially extending areas 34 each carrying chevron-shaped foils 36. In the embodiment shown in FIGS. 1 and 2, four chevron-shaped foils 36 are arranged equidistantly about the circumference of impeller 32, being attached at about their midpoints to rotor arms 34 and near their ends to attachment rings 38 and 40. Attachment rings 38 and 40 serve to stabilize foils 34 as they are rotated.

As best illustrated in FIG. 2, foils 36 have a tear drop shape in cross section as is conventional in the art. This shape, when the foils are rotated, enables the leading edges to create a positive pressure condition which tends to force good fibers in the clearance between the foils and screenplate 12 through the screenplate. At the same time, a negative pressure condition is developed at the trailing ends of the foils which is effective in drawing away from the screenplate surface large particles which would otherwise tend to remain in place and clog the screenplate. As the foils are continuously rotated, these positive and negative pressure conditions form pressure waves rotating with the foils and continuously tending to force good fiber through the screenplate and to withdraw large particles away from the surface of the screenplates.

Foils 36 are designed to have a chevron or V-shape which will act to divide the incoming feed stock slurry into an upward flow portion and a downward flow portion. As illustrated in FIG. 1, as the foils are rotated in a clockwise direction the upper sections of the foils will impart an upwardly directed force to the feed stock in the upper portion of screening chamber 16 while the lower sections of the foils impart a downwardly directed force to the feed stock in the lower portion of the screening chamber. As shown, the foils are angled away from vertical approximately 10°–15°, although the angle may be varied to obtain the desired upward and downward stock flow for different sized screening apparatuses and/or different feed stock consistencies.

Impeller 32 is mounted for rotation on shaft 42 which is enclosed in central shaft housing 44. On the opposite end of shaft 42, pulley sheaves 46 or other suitable means are mounted to drive the shaft by means of a motor (not shown).

In operation, feed stock enters the apparatus through inlet 18 and flows in the direction shown by the arrows in FIG. 1 through conduit 20 and into screening chamber 16. A portion of the feed stock is directed upwardly by rotating foils 36 along the upper portion of screenplate 12 while a second portion of the feed stock is directed downwardly by foils 34 along the lower portion of screenplate 12.

Good fibers pass through the screenplate and are collected in accepts chamber 14 for ulitimate removal through outlet 22. Heavy impurities which are not passed through the screenplate migrate downwardly and are collected in rejects collection chamber 26 while light impurities migrate upwardly and are collected in rejects collection chamber 24. The rejects including both heavy and light impurities as well as large particles, are removed through outlets 28 and 30.

Figure 4:
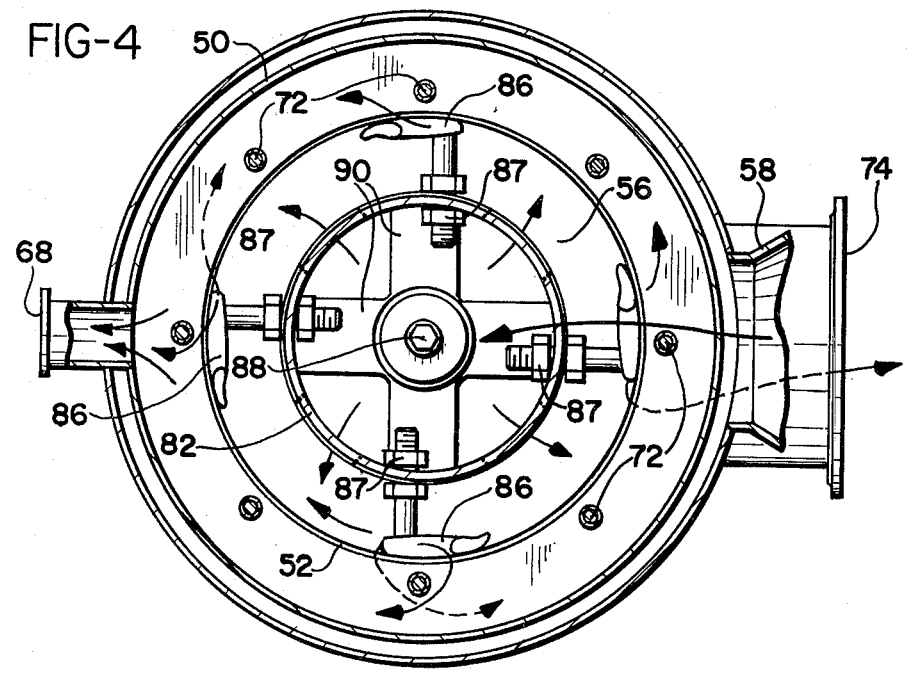
FIG. 4 is a cross-section taken along line 4—4 in FIG. 3.

Another embodiment of the invention is illustrated in FIGS. 3 and 4. In this embodiment, a pressurized housing 50 has a top cover 51, and an elongated, cylindrically-shaped screenplate 52 having slots or holes 53 therein. The screenplate 52 divides the housing into an annular outer accepts chamber 54 and an inner screening chamber 56.

The slurry or suspension to be screened enters inlet 58 located near the top of the housing and passes over and through flow diverter 60 before being introduced into screening chamber 56. Flow diverter 60 comprises a conduit 62 having a generally circular, annular plate 64 welded or otherwise attached thereto. With circumferential wall 66 and rejects outlet 68, flow diverter 60 also forms a rejects collection chamber 70. The entire structure is mounted at the top of screenplate 52 and is attached to housing 50 by means of bolts 72 or other suitable attachment means.

An outlet 74 for accepted fiber is provided in fluid communications with accepts chamber 54. Large fibers and other impurities which do not pass through screenplate 52 are collected in rejects collection chambers 70 and 76 for removal from the apparatus through rejects outlets 68 and 78, respectively.

A rotating impeller 80 is located in screening chamber 56 with its vertical axis concentric to screenplate 52. The impeller 80 comprises a hollow, generally cylindrical casing 82 having at least one passage 84 therethrough to permit the flow of feed stock outwardly into screening chamber 56. Four chevron-shaped foils 86 are arranged equidistantly about the circumference of impeller 80 and are attached to casing 82 by suitable means such as bolts 87. Impeller 80 is mounted for rotation on shaft 88 by a hub 89 and connecting rotor arms 90. A center shaft housing 92 surrounds shaft 88 in housing 50. Pulley sheaves 94 or other suitable means are mounted to the opposite end of shaft 88 and are driven by a suitable motor or other drive means (not shown).

As best illustrated in FIG. 4, foils 86 are teardrop shape in cross section as is conventional in the art. This shape, as explained above, creates positive and negative pressure waves as the foils are rotated which force good fibers through openings 53 in screenplate 52 while withdrawing large particles from the openings which would otherwise tend to clog the screenplate. Foils 86 also have the chevron or V-shape described above and act to divide the incoming feed stock slurry into an upward flow portion and a downward flow portion.

In operation, feed stock enters the apparatus through inlet 58 and flows in the direction shown by the arrows in FIG. 3 through flow diverter 60. The stock then flows into hollow casing 82 of impeller 80 and outwardly through openings 84 towards the screenplate. The clearance between the lower end of conduit 62 and the upper surface of casing 82 is maintained at a minimum so that a substantial portion of the feedstock will be directed into the central portion of impeller 80. Openings 84 are located at about the midpoint both of screenplate 52 and chevron-shaped foils 86 so that a major portion of the feed stock will enter screening chamber 56 at a midpoint along the vertical axis thereof. In this manner, the foils 86 can divide the feed stock stream into substantially equal upward and downward flow portions.

Good fibers pass through the screenplate and are collected in accepts chamber 54 for ultimate removal through outlet 74. Impurities which are not passed through the screenplate are forced downwardly and are collected in rejects collection chamber 76 for removal through outlet 78 and upwardly and are collected in rejects collection chamber 70 for removal through outlet 68.

A significant advantage of the embodiment illustrated in FIGS. 3 and 4 is that prior art pressurized screening devices can be adapted easily to the practice of the present invention by the replacement of relatively few parts. By replacing a prior art rotary impeller mechanism and mounting an appropriately sized impeller 80, flow diverter 60 and cover 51 into the housing, the prior art device is converted into the dual flow system of the present invention with all of its attendant advantages.

Although the invention has been described as a vertically-oriented device, it will be appreciated by those skilled in the art that it can be rotated 90° onto its side and be modified to function in the same manner. The advantages of using a chevron-shaped rotor are also realized in a horizontally-oriented pressurized screening device.

While the apparatus described herein constitute preferred embodiments of the invention, it will be appreciated by those skilled in the art that the invention is not limited to these precise apparatus, and that changes may be made herein without departing from the scope of the invention, which is defined in the appended claims.

What is claimed is:

1. A pressurized screening apparatus comprising, a pressurized housing, screening means located in a fixed position within said housing for separating feed stock into at least one accepts portion and a plurality of rejects portions, means for continuously supplying feed stock to a space intermediate the first and second ends of said screening means, means for dividing said feed stock into first and second flow portions directed to said first and second ends, respectively, of said screening means, said means for dividing said feed stock including rotary impeller means extending at least a portion of the length of said screening means and mounted for axial rotation therein, said rotary impeller means including a plurality of rotor foils supported thereon and positioned within a short distance of the radially inward facing surface of said screening means, means for continuously withdrawing the accepts portion of said feed stock from said housing, and means for collecting and continuously withdrawing the rejects portions of said first and second flow portions of said feed stock from said housing.

2. The apparatus of claim 1 wherein said means for screening feed stock includes a generally cylindrical screenplate dividing the interior of said housing into an inner stock screening chamber and an outer annular accepts chambers.

3. The apparatus of claim 1 wherein each of said rotor foils is chevron-shaped.

4. The apparatus of claim 1 wherein said means for collecting and withdrawing the rejects portion of the first and second flow portions of said feed stock includes first and second chambers located in said housing near the first and second ends of said screening means, respectively, and in fluid communication with the inner side thereof.

5. The apparatus of claim 1 wherein said means for continuously supplying stock to said screening means includes a stock inlet located at the base of said housing adjacent said first end of said screening means and conduit means directing said stock to the interior thereof.

6. The apparatus of claim 1 wherein said means for continuously supplying stock to said screening means includes a stock inlet located adjacent said second end of said screening means and flow diverter means directing said stock to the interior of said housing.

7. The apparatus of claim 1 wherein said rotary impeller means includes a hollow generally cylindrical housing open at both ends, and having at least one opening through the central portion thereof permitting stock to flow from the interior thereof to said screenplate.

8. A pressurized screening apparatus comprising:
a pressurized housing having stock inlet means, accepts outlet means, and rejects outlet means;
generally cylindrical screenplate means located in said housing, said screenplate means forming in conjunction with said housing an inner stock screening chamber and an outer annular accepts chamber;
rotary impeller means extending at least a portion of the length of said screenplate means and mounted for axial rotation within said screenplate means, said rotary impeller means including a plurality of rotor foils positioned within a short distance of the radially inward facing surface of said screenplate means, each of said rotor foils including means for dividing stock into first and second flow portions directed toward opposite ends of said screenplate means; and means for driving said rotary impeller means within said inner stock screening chamber, whereby at least a portion of said stock passes through said screenplate means into said annular accepts chamber and the portions of said first and second flow portions of stock which do not pass through said screenplate means are continuously collected in first and second rejects collection chambers located at opposite ends of said screenplate means, respectively, and are continuously withdrawn through said rejects outlet means.

9. The apparatus of claim 8 wherein each of said rotor foils is chevron-shaped.

10. A kit for the conversion of a pressurized screening device having cylindrical screenplate means to a dual flow screening device comprising, rotary impeller means adapted to be mounted for axial rotation in the housing of a screening device, said rotary impeller means extending at least a portion of the length of said screenplate means and including a plurality of rotor foils positioned within a short distance of the radially inward facing surface of said screenplate means, each of said rotor foils including means for dividing stock into first and second flow portions directed toward opposite ends of said screenplate means, flow diverter means adapted to be mounted in said housing adjacent one end of said rotary impeller means for directing the flow of feed stock to said rotary impeller means, said flow diverter means including means forming a first rejects collection chamber for said device, and cover means having a feed stock inlet and adapted to fit over said flow diverter means in sealing relation therewith.

* * * * *